United States Patent
Tamai

(10) Patent No.: US 6,543,923 B2
(45) Date of Patent: Apr. 8, 2003

(54) VEHICLE LAMP

(75) Inventor: Hiroyuki Tamai, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/920,539

(22) Filed: Aug. 1, 2001

(65) Prior Publication Data

US 2002/0034080 A1 Mar. 21, 2002

(30) Foreign Application Priority Data

Aug. 2, 2000 (JP) ........................................ 2000-233829

(51) Int. Cl.[7] ................................................ F21V 5/00
(52) U.S. Cl. ..................... 362/521; 362/520; 362/522; 362/308; 362/309; 362/328; 362/333; 362/339; 362/485; 362/487; 362/517
(58) Field of Search ................................. 362/520, 521, 362/522, 308, 309, 327, 328, 333, 339, 459, 485, 487, 517, 343

(56) References Cited

U.S. PATENT DOCUMENTS

| | | | | |
|---|---|---|---|---|
| 4,329,738 A | * | 5/1982 | Heinz et al. | 362/520 |
| 4,530,040 A | * | 7/1985 | Petterson | 362/188 |
| 5,081,564 A | * | 1/1992 | Mizoguchi et al. | 362/521 |
| 5,128,839 A | * | 7/1992 | Kato | 362/521 |
| 5,658,072 A | | 8/1997 | Natsume et al. | |
| 6,012,831 A | | 1/2000 | Maekawa | |
| 6,045,246 A | | 4/2000 | Goto | |
| 6,059,436 A | * | 5/2000 | Hashigaya | 362/544 |
| 6,296,382 B1 | * | 12/2001 | Hamelbeck | 362/544 |

* cited by examiner

Primary Examiner—Sandra O'Shea
Assistant Examiner—Sharon Payne
(74) Attorney, Agent, or Firm—Koda & Androlia

(57) ABSTRACT

A vehicle lamp such as a rear combination lamp comprising: a reflex reflector lens that is fitted in a front lens of the lamp so as to reflect the light from the outside the vehicle lamp back to the outside, and a light reflector that is formed in the front lens so as to face the reflex reflector lens and to entirely reflect the light from a light source toward the light source. The vehicle reflex reflector lens is made of a material that has a lower heat resistance than the front lens.

12 Claims, 6 Drawing Sheets

VEHICLE LAMP

BACKGROUND OF THE INVENTION

1. Field of the Invention

The present invention relates to a vehicle lamp and more particularly to an improvement in a vehicle lamp such as a rear combination lamp that has a reflex reflector.

2. Prior Art

Some of rear combination lamps or the like disposed at the rear portion of an automobile or other vehicle are provided with a "reflex reflector" having a function of reflecting light that has entered from outside toward the following vehicle, thereby improving visibility of the vehicle.

In many cases, this reflex reflector is formed with, for example, a lens with steps additionally disposed for reflecting light that has entered from outside, further to the outside of the front lens which is disposed so as to block a frontal opening of a lamp chamber housing a light source.

Alternatively, as shown in FIG. 7, a lens 101 is disposed so as to block a lamp chamber 103 which is formed inside of a reflector 106 formed on the inner surface of a parabola-shaped lamp body 107 of a lamp 100. The lens 101 has a concave portion 104 recessed toward a light source 105.. Furthermore, a lens 102 with steps 108 for reflecting light from outside is attached to the concave portion 104 so as to perform a reflex reflector function.

However, the structure of the conventional reflex reflector shown in FIG. 7 has problems. The light Pa emitted from the light source 105 (and light Pb reflected by the reflector 106) is transmitted through the lens 101 and irradiated to a lens disposed as a reflex reflector (hereafter referred to as "a reflex reflector lens.")

Therefore, a heat-resistant synthetic resin material such as polycarbonate (hereinafter referred to as PC) with a heat resistance temperature of 135C also needs to be used for the reflex reflector lens 102, as in the case for the lens 101.

It is unavoidable to use a heat resistant material for the lens 101 disposed in a position opposing the light source 105. In this regard, a heat resistant material needs to be used not only for the lens 101, but also for the lens 102 for the reflex reflector.

In such cases, since a heat resistant synthetic resin material such as PC is more expensive than a material with low heat resistance such as polymethylmethacrylate, a vehicle lamp, particularly the one with a reflex reflector, faces the technical challenge of cost reduction.

SUMMARY OF THE INVENTION

Therefore, it is an object of the present invention to reduce the cost of a vehicle lamp by eliminating the necessity for use of a heat resistant material for a reflex reflector lens by devising a lens structure around the reflex reflector.

The above object is accomplished by a unique structure for a vehicle lamp that includes a light chamber formed by a lamp body and a lens; and the unique structure of the present invention is that the vehicle lamp further comprises: a reflex reflector lens which is separately formed from the lens, and a light reflection means or a light reflecting section disposed in a region that is a part of the lens and faces a light source, such a light reflecting means or the light reflection means reflecting light emitted from the light source toward the light source.

Since this light reflection means reflects light from the light source (along with the light reflected by the reflector), no light from the light source is irradiated to the reflex reflector lens. Accordingly, temperature rise in the reflex reflector lens is kept small.

In the above structure, the light reflection means or the light reflecting section is disposed in a region that opposes or faces the light source. In other words, the light reflection means (the light reflecting section) is disposed in a region in front of the light source. Thus, it is possible to reliably reflect the light, which is directly traveling from the light source, toward the light source and to more reliably limit the temperature rise in the reflex reflector lens.

The light reflection means or the light reflecting section is provided in a lens that is an essential component of a vehicle lamp. More specifically, a lens is arranged so as to be interposed between the reflex reflector lens and the light source, and reflective steps are formed in the light reflection means (light reflecting section) that faces the reflex reflector lens. The reflective step portion entirely reflects the light emitted from the light source.

In a more preferable structure, the above reflective step is provided on a surface of the front lens that faces the light source (i.e. on a surface facing the light source) so as to project toward the light source. With this structure, the light emitted from the light source is reflected at a position that is as close as possible to the light source (i.e. a position as far as possible from the reflex reflector lens), thus keeping the temperature rise in the reflector lens as small as possible.

Furthermore, the reflective step is formed with minute cone-shaped steps. By way of arranging a plurality of cone-shaped steps, a reflective effect on the light emitted from the light source can be reliably displayed.

With the above-described structure, the need for using a heat resistance material such as polycarbonate for the reflex reflector lens can be avoided, it is thus possible to use a less costly material such as polymethylmethacrylate or the like. In other words, it is possible to use a material with lower heat resistance than the lens. Consequently, cost reduction for a vehicle lamp that has a reflex reflector lens can be reliably achieved.

DETAILED DESCRIPTION OF THE INVENTION

Preferred embodiments of the present invention will be described below with reference to the accompanying drawings.

Figure 1:
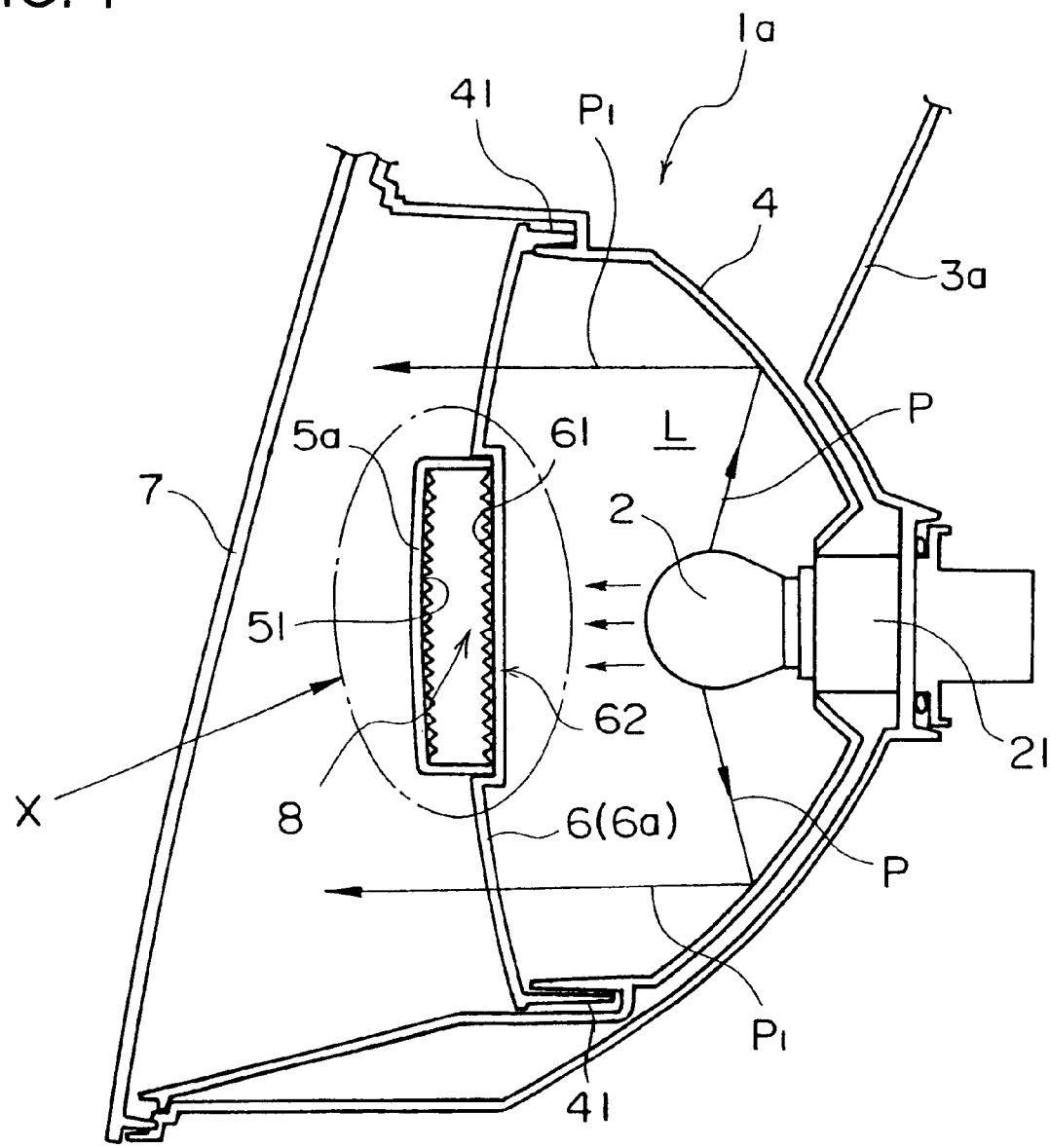
FIG. 1 is a horizontal sectional view of the first embodiment of a vehicle lamp according to the present invention.

As seen from FIG. 1, the vehicle lamp 1a of this embodiment is a rear combination lamp that is disposed at the rear portion of an automobile. The vehicle lamp 1a is substantially comprised of a lamp body 3a made of synthetic resin and a front lens 6a that form a lamp chamber L. An incandescent bulb that serves as a light source 2 is provided inside the lamp chamber L. A reflector 4 is attached to a base portion 21 that holds the light source 2. The reflector 4 is for reflecting the light emitted from the light source P (i.e. the light emitted from the light source 2) and converting such light to outside irradiation light $P_1$.

An engagement groove is formed in a peripheral edge portion 41 of a forward projecting portion of the reflector 4. To this engagement groove portion, the front lens 6a made of polycarbonate with high heat resistance (i.e. having heat resistance temperature of 135° C.) is attached. In addition, a transparent outer lens 7 is disposed outside of the front lens 6a.

The front lens 6a has a concave portion 62 that is round when viewed from the front. The round concave portion 62 is formed so as to be recessed toward the light source 2, and it is provided at substantially the central region of the front lens 6a. A reflex reflector lens 5a which has a U-shaped horizontal cross section and is round when viewed from the front is fitted inside the concave portion 62 of the front lens 6a.

Figure 2:
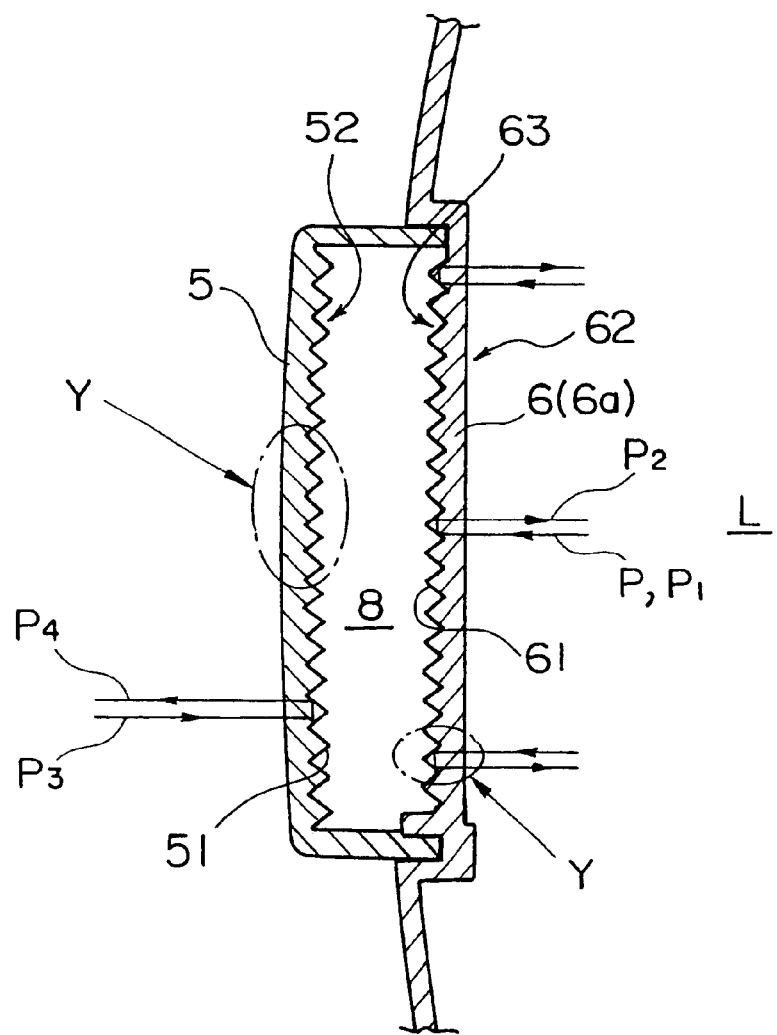
FIG. 2 is an enlarged view of a portion around the reflex reflector lens designated by X in FIG. 1.

FIG. 2 shows the detail of the reflex reflector lens 5a referred to by X in FIG. 1. As seen from FIG. 2, a plurality of reflective steps 51 projecting toward the light source 2 are provided in a portion 52 of the reflex reflector lens 5a. The portion 52 is the bottom of the reflex reflector lens 5a when the reflex reflector lens is placed horizontally with its opened end upward.

The reflective steps 51 has a function of ensuring visibility of the vehicle by way of reflecting back the outside light $P_3$ and the like such as a light beam coming from a vehicle behind to the outside. The reference character $P_4$ in FIG. 2 denotes the light reflected by the reflective steps 51.

On the other hand, a plurality of reflective steps 61 are provided on a surface 63 of the concave portion 62 of the front lens 6a. The surface 63 faces the reflex reflector lens 5a, and the plurality of reflective steps 61 project toward the reflex reflective steps 51 of the reflector lens 5a.

The reflective steps 61 entirely reflect, toward the light source, the light emitted from the light source P that travels directly forward from the light source 2 and enters the concave portion 62 of the front lens 6a front lens 61. The reflective steps 61 also entirely reflect the outside light $P_1$ which is the light emitted from the light source P, reflected by the reflector 4 and enters the concave portion 62 of the front lens 6a. Namely, the reflective steps 61 allow the light emitted from the light source P and the outside light $P_1$ not to be irradiated to the reflex reflector lens 5a.

With this reflective effect of the reflective steps 61, the reflex reflector lens 5a is prevented as much as possible from being heated, which allows the use of polymethylmethacrylate that has a lower heat resistance (i.e. having a heat resistance temperature of 102° C.) than polycarbonate: Polymethylmethacrylate is more advantageous in terms of cost due to its low price.

Figure 3:
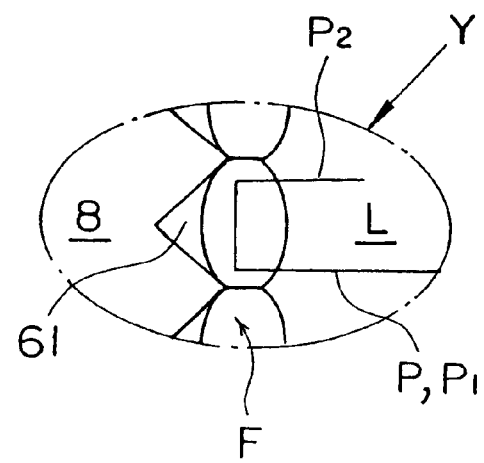
FIG. 3 is a partially enlarged perspective view of the reflective step portion designated by Y and seen from the light source 2.

FIG. 3 illustrates the light source 2 of the reflective step portion 61 designated by Y in FIG. 2. As seen from FIG. 3, the reflective steps 61 are structured by arranging cone-shaped steps. The cone-shaped reflective steps 61 are efficient in reflection so that they can entirely reflect the light emitted from the light source P and the external light $P_1$ toward the light source when they have entered the inner surface of the cone F of the reflective steps 61. The reference character $P_2$ in FIGS. 2 and 3 refers to the reflected light formed by the reflective steps 61.

Figure 4A:
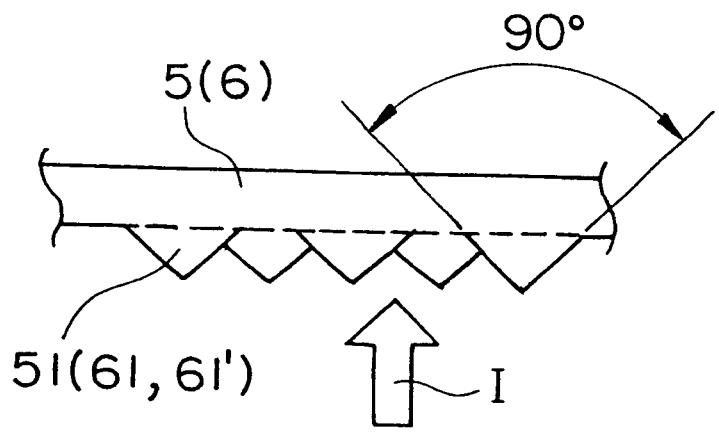
FIG. 4(*a*) is a partial side view of the reflective steps, FIG. 4(*b*) is a front view of the reflective steps seen from the top (i.e. seen in the direction shown with arrow 1 in FIG. 4(*a*)), and FIG. 4(*c*) is a partially perspective view of a part of the reflective steps diagonally seen from the top thereof.
Figure 4B:
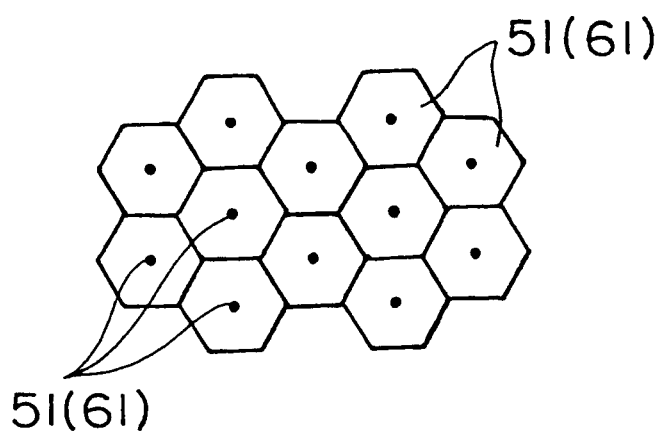
Figure 4C:
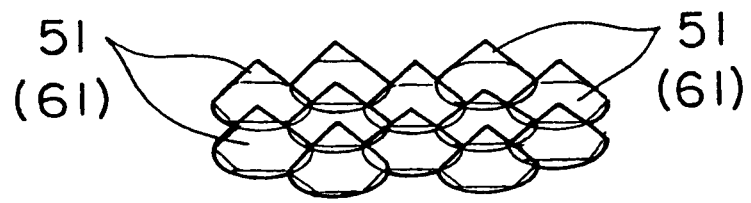

FIGS. 4(1), 4(b) and 4(c) illustrate in more detail the structure of the reflective steps 51 formed on the reflex reflector lens 5 and the reflective steps 61 formed on the front lens 6. FIG. 4(a) shows the side of the reflective steps 51 and 61, FIG. 4(b) shows the front of the reflective steps 51 and 61 seen in the direction of arrow 1 in FIG. 4(a), and FIG. 4(c) is diagonally shows the reflective steps 51 and 61. As seen from these FIGS. 4(1), 4(b) and 4(c), the reflective steps 51 and 61 have the same structure, and they are both formed with a plurality of projecting cone-shaped steps. The angle of the vertex portions of the reflective steps 51 and 61 is set at 90° (see FIG. 4(a) in the shown embodiment.

Figure 5:
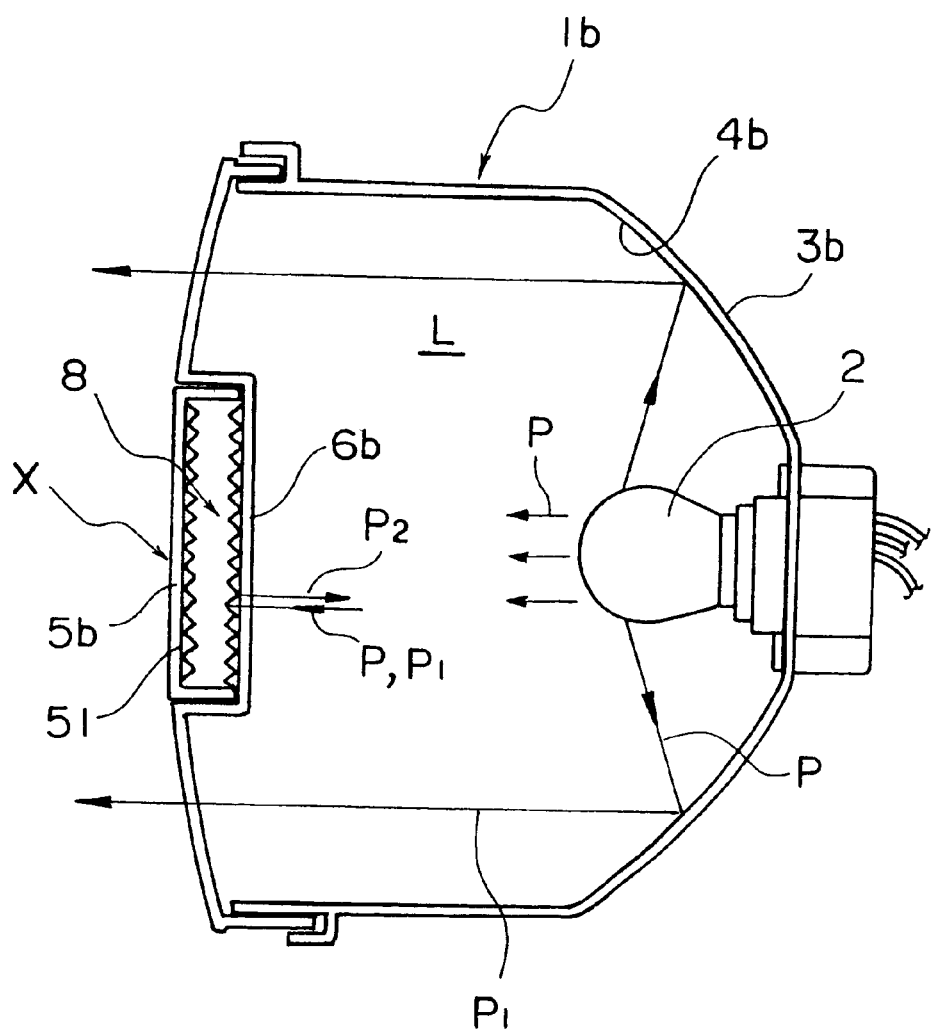
FIG. 5 is a horizontal sectional view of the second embodiment of a vehicle lamp according to the present invention.

FIG. 5 is a horizontal sectional view of the second embodiment of a vehicle light according to the present invention.

In the vehicle lamp 1b of the second embodiment, the reflex reflector lens 5b is fitted in the concave portion 62 a front lens 6b in such a manner that the reflex reflector lens 5b thereof is embedded in the concave portion 62 of the front lens 6b which is disposed so as to serve as an outer lens and the front surface of the front lens 6b and the front surface of the reflex reflector lens 5b are made flush. Since the reflective steps 51 and 61 have the same structure to the first embodiment 1a, a detailed explanation thereof is omitted. A reflector 4b is formed in the inner surface of a lamp body 3b.

Figure 6:
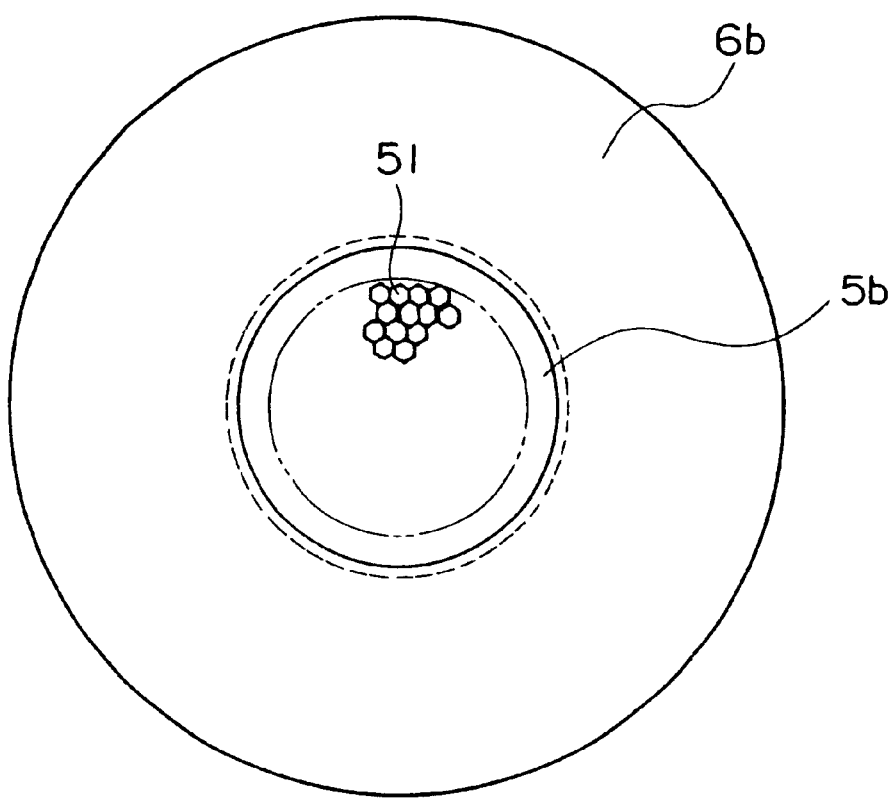
FIG. 6 is a front view of the second embodiment.
Figure 7:
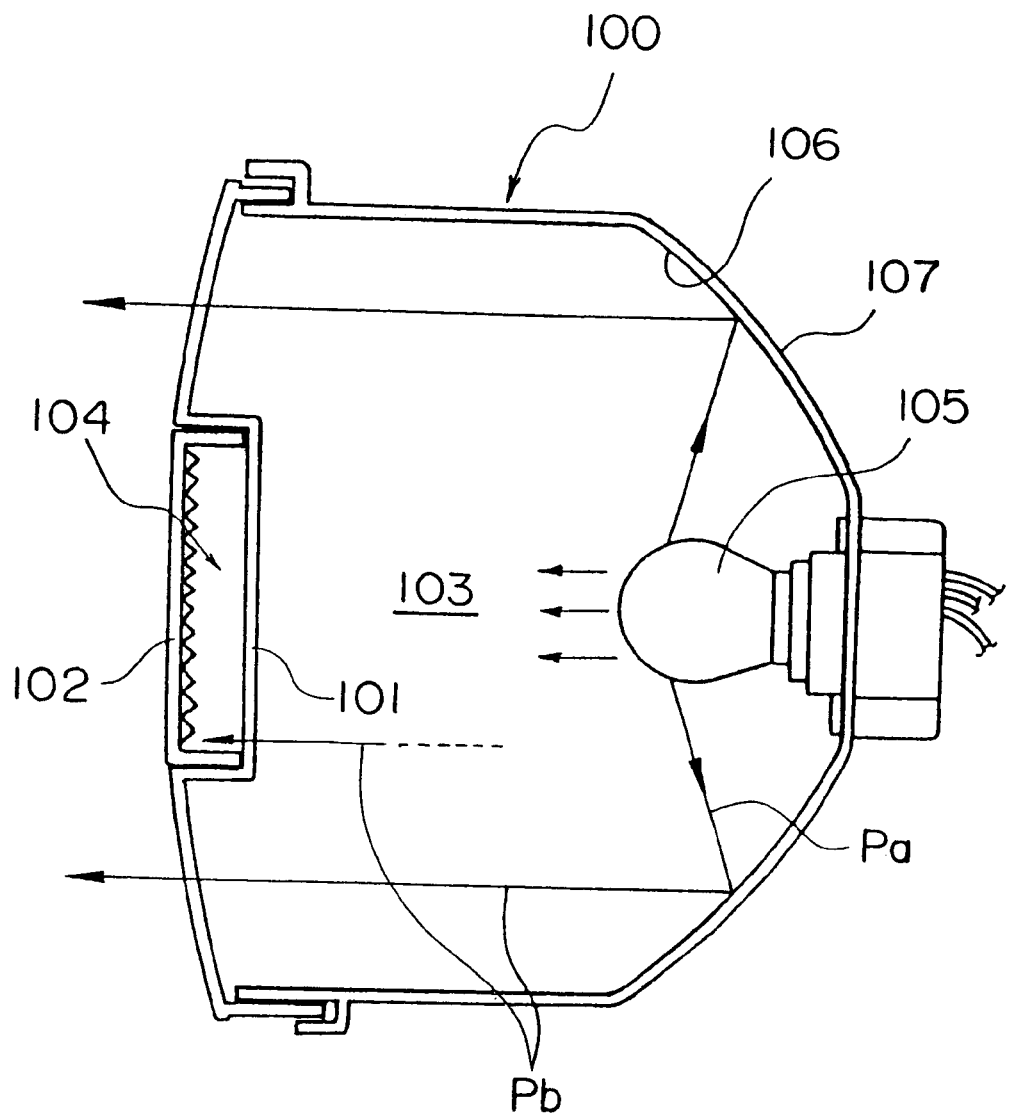
FIG. 7 illustrates the structure of a prior art vehicle lamp.

FIG. 6 illustrates the lamp 1b of the second embodiment viewed from the front. As seen from FIG. 6, the reflex reflector lens 5b is provided at substantially the central portion of the front lens 6b, enabling the reflective steps 51 of the flex reflector lens 5b to be seen through.

As described above, in the vehicle lamps 1a and 1b of the present invention, the light reflection means or the light reflecting section are provided, and the reflex reflector lenses 5a and 5b thereof are less likely heated. Accordingly, the reflex reflector lenses 5a and 5b are made of a material which has lower heat resistance with a heat resistance temperature of approx. 100° C. and which is lower in cost.

As seen from the above, the vehicle lamp according to the present invention ensures a cost reduction of the vehicle lamp by way of the structure in which the light emitted from the light source is not irradiated to the reflex reflector lens. Thus, the present invention eliminates the necessity of using an expensive heat resistant material for the reflection reflector lens.

I claim:

1. A vehicle lamp provided with a lamp body and a front lens that form a lamp chamber, comprising:
   a reflex reflector lens which is an element independent from said front lens, and
   a light reflection means provided in said front lens so as to face said reflex reflector lens and to reflect light emitted from a light source toward said light source.

2. The vehicle lamp according to claim 1, wherein said light reflection means is provided so as to face said light source.

3. The vehicle lamp according to claim 1, wherein said light reflection means is a reflective step formed in said lens and provided between said reflex reflector lens and said light source.

4. The vehicle lamp according to claim 2, wherein said light reflection means is a reflective step formed in said lens and provided between said reflex reflector lens and said light source.

5. The vehicle lamp according to claim 3, wherein said reflection step comprises cone-shaped steps.

6. The vehicle lamp according to claim 1, wherein said reflex reflector lens is formed of a material having a lower heat resistance than said lens.

7. The vehicle lamp according to claim 2, wherein said reflex reflector lens is formed of a material having a lower heat resistance than said lens.

8. The vehicle lamp according to claim 3, wherein said reflex reflector lens is formed of a material having a lower heat resistance than said lens.

9. The vehicle lamp according to claim 5, wherein said reflex reflector lens is formed of material having a lower heat resistance than said lens.

10. A vehicle lamp provided with a lamp body and a lens that form a lamp chamber and a light source provided in said lamp body, said vehicle lamp comprising:

a light reflecting section formed in said lens so as to face, with one side thereof, said light source and reflect light emitted from said light source toward said light source; and a reflex reflector lens fitted inside said light reflecting section, and wherein said reflex reflector lens is formed with a reflective step and said light reflecting section is formed, on another side thereof, with a reflective step that faces said reflective step formed on said reflex reflector lens.

11. The vehicle lamp according to claim 10, wherein said reflective step formed on said reflex reflector lens and said reflective steps formed on said light reflecting section respectively comprises a plurality of cone-shaped steps formed thereon.

12. The vehicle lamp according to claim 10, wherein said reflex reflector lens is formed of a material having a lower heat resistance than said lens.

* * * * *